United States Patent
Stewart

(10) Patent No.: US 8,217,955 B2
(45) Date of Patent: Jul. 10, 2012

(54) PRODUCING WRINKLES AND OTHER EFFECTS FOR A COMPUTER-GENERATED CHARACTER BASED ON SURFACE STRESS

(75) Inventor: Ian Stewart, Pierrefonds (CA)

(73) Assignee: Autodesk, Inc., San Rafael, CA (US)

( * ) Notice: Subject to any disclaimer, the term of this patent is extended or adjusted under 35 U.S.C. 154(b) by 628 days.

(21) Appl. No.: 12/186,006

(22) Filed: Aug. 5, 2008

(65) Prior Publication Data

US 2010/0033492 A1 Feb. 11, 2010

(51) Int. Cl.
 *G09G 5/00* (2006.01)
(52) U.S. Cl. .......................... 345/584; 345/581
(58) Field of Classification Search ........... 345/582–588
See application file for complete search history.

(56) References Cited

U.S. PATENT DOCUMENTS

| | | | |
|---|---|---|---|
| 7,138,999 B2* | 11/2006 | Alliez et al. ................ | 345/423 |
| 7,298,374 B2* | 11/2007 | Styles .......................... | 345/473 |
| 7,756,343 B2* | 7/2010 | Li et al. ....................... | 382/228 |
| 7,983,882 B1* | 7/2011 | Fujisaki ........................ | 703/6 |
| 2004/0056857 A1* | 3/2004 | Zhang et al. ................. | 345/419 |
| 2005/0248582 A1* | 11/2005 | Scheepers et al. .......... | 345/586 |
| 2007/0070365 A1* | 3/2007 | Boregowda et al. ......... | 358/1.9 |
| 2008/0024512 A1* | 1/2008 | Chuter .......................... | 345/584 |
| 2009/0028380 A1* | 1/2009 | Hillebrand et al. .......... | 382/100 |
| 2009/0161983 A1* | 6/2009 | Ciurea .......................... | 382/275 |

* cited by examiner

*Primary Examiner* — Said Broome
*Assistant Examiner* — Wynton S Jones
(74) *Attorney, Agent, or Firm* — Patterson & Sheridan, LLP

(57) ABSTRACT

Wrinkles are produced by computing directional stress, whether compression or stretching, for each pixel within each face of the mesh representing the skin, and then perturbing a surface normal based on the computed stress at each pixel in that face of the mesh. Directional stress at a given frame in an animation is determined, in general, by comparing the current state of the mesh at that frame (called a "current pose") to the original state of the mesh (called a "rest pose"). An artist specifies a wrinkle pattern by defining a texture that is mapped to the surface, using conventional techniques. A gradient texture is created from this wrinkle texture by computing the gradient at each pixel in the wrinkle texture. For each location in a face of the surface, the vector from the gradient texture is mapped to the corresponding face of the rest pose skin model and the current pose skin model, to produce two surface vectors. These two vectors are compared to provide an estimate of the surface stress at this location in the face. A wrinkle effect may be implemented using bump mapping, but the surface normal is perturbed differently for each location in the face of the mesh based on the skin stress estimated at that location. Other effects also may be created using the estimated stresses.

20 Claims, 2 Drawing Sheets

PRODUCING WRINKLES AND OTHER EFFECTS FOR A COMPUTER-GENERATED CHARACTER BASED ON SURFACE STRESS

BACKGROUND

To create more realistic characters in computer-generated images and computer-generated animation, such as for art, games, motion pictures and other computer graphics animations, it is desirable to produce a variety of lighting and coloration effects, such as wrinkles, on the skin of a character. Wrinkles typically are applied on the face or hand, but could be applied to the skin of other body parts. Wrinkles also could be applied to other surfaces.

In the context of both computer games and content creation applications, which enable artists to define a character and its appearance, wrinkles should be easily defined, viewed and changed. Ideally, these operations should be performed quickly enough to avoid making an artist wait to see results. The application should allow an artist to view the character in animation over time. In a game, these operations are performed in real time during game play.

Several techniques currently exist for implementing wrinkles in content creation applications and games. Software implemented rendering systems generally produce wrinkles with very high quality. However, such systems generally do not perform in real time. Real time applications generally involve implementation on a graphics processing unit (GPU).

One GPU-implemented technique simulates wrinkles by using per-pixel "bump mapping." This technique involves generating a model of a surface at each vertex in a mesh representing a skin model, using what is called a vertex shader. This information for each vertex of a face is interpolated over each face (usually a triangle) in the mesh, when that information is passed to a fragment shader that generates the actual display data for that face.

Other examples of techniques for generating wrinkle patterns are described in:

1. "Dynamic Wrinkle Patterns and Hatching on Animated Meshes," by Jörn Loviscach, in ShaderX5: Advanced Rendering Techniques, edited by Wolfgang Engel, (Charles River Media, 2006), pp 31-48.
2. "Fast Geometrical Wrinkles on Animated Surfaces," by Pascal Volino and Nadia Magnethat Thalmann, in $7^{th}$ International conference on Computer Graphics and Visualization, pp. 55-66, 1999.

SUMMARY

Wrinkles and other effects are produced by computing surface stress, whether compression or stretching, for each pixel within each face of the mesh representing the skin. This computed stress is used to apply an effect. For example, for generating wrinkles, a surface normal is perturbed based on the computed stress at each pixel in that face of the mesh. Stress at a given frame in an animation is determined, in general, by comparing the current state of the mesh at that frame (called a "current pose") to the original state of the mesh (called a "rest pose").

More particularly for wrinkles, an artist specifies a wrinkle pattern by defining a texture that is mapped to the surface, using conventional techniques. A gradient texture is created from this wrinkle texture by computing the gradient at each pixel in the wrinkle texture. For each location in a face of the surface, the vector from the gradient texture is mapped to the corresponding face of the rest pose skin model and the current pose skin model, to produce two surface vectors. These two vectors are compared to provide an estimate of directional stress at this location in the face. A wrinkle effect may be implemented using bump mapping, but the surface normal is perturbed differently for each location in the face of the mesh based on the skin stress estimated at that location.

Such effects can be controlled easily using user painted maps. These effects also can be layered. Effects other than wrinkles also can be generated using the estimate of stress at each location. For example, changes in the coloration of skin due to changes in blood levels responsive to surface stress can be created. In this effect, color is changed instead of the surface normal based on the estimated stress and a user defined skin coloration pattern.

DESCRIPTION OF DRAWINGS

Like reference symbols in the various drawings indicate like elements.

DETAILED DESCRIPTION

Figure 1:
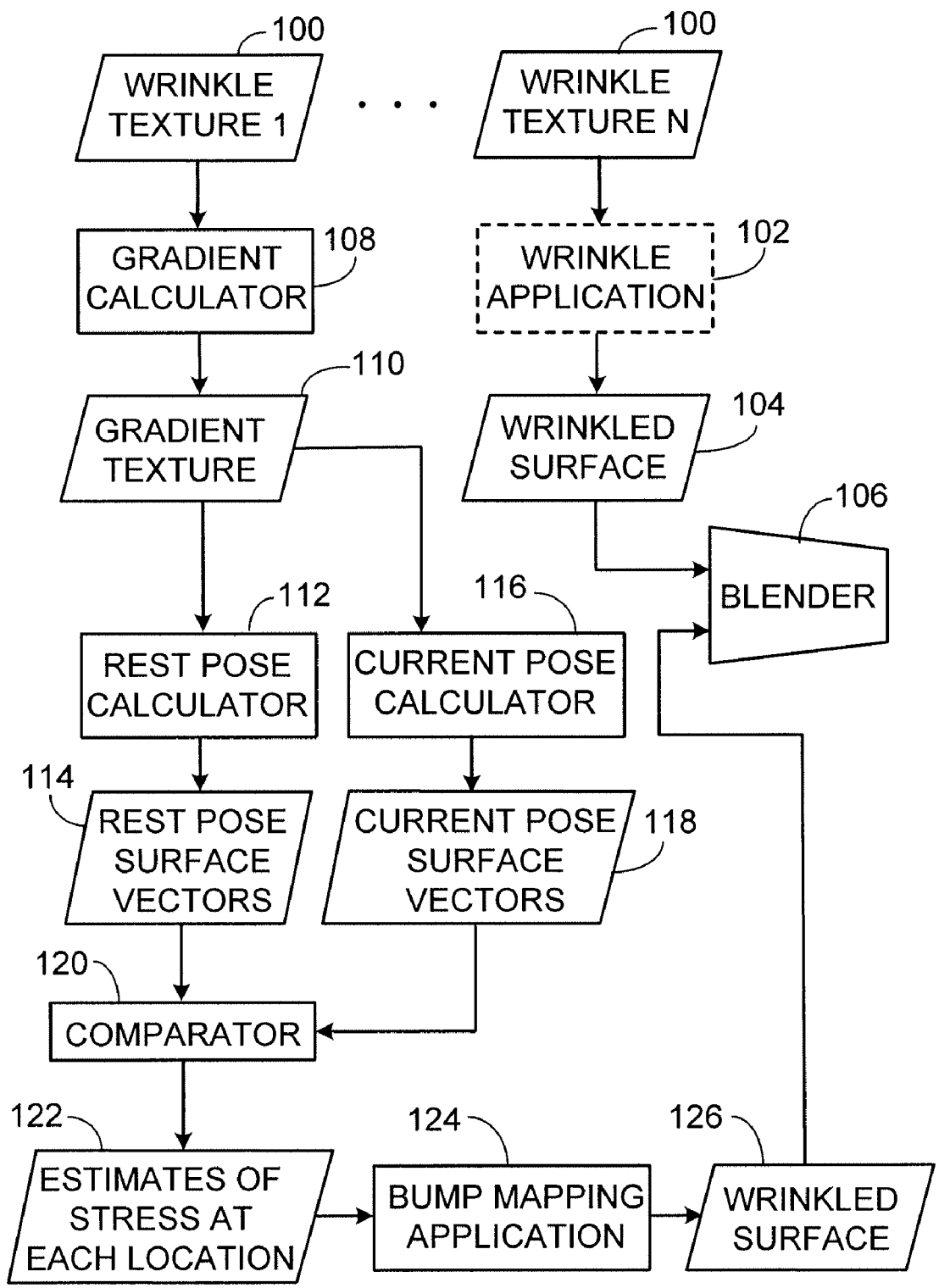
FIG. 1 is a data flow diagram describing an example implementation for generating wrinkles.

Referring now to FIG. 1, a data flow diagram for an example implementation for generating wrinkles will now be described. It should be understood that similar principles apply to the generation of other effects.

One or more wrinkle textures 100 are defined by an artist to define the wrinkle pattern that should be applied to a surface. The surface typically is the skin of a character, which is defined by a mesh with multiple faces. Each face in a mesh usually is a triangle, or other polygon, but may also be non-planar in exceptional cases. Each face of the mesh is defined by three or more vertices that are interconnected by edges. The mesh may represent a surface other than the skin of a character, but the most common application of wrinkles involves skin.

The wrinkle texture is typically user-defined and may be specified by an artist using any of many conventional techniques, such as a computer paint application or 3D paint tool that allows painting directly on the surface of a computer generated and displayed 3D object. The wrinkle texture is mapped to the surface of the skin model, using conventional techniques. High intensity regions of a wrinkle texture typically represent portions of the surface that will bulge when compressed. Low intensity regions of a wrinkle texture typically represent portions of the surface that will become wrinkle crevasses. Other types of effects would use a similar texture pattern or other function to map stress to the desired result (such as a color change) in response to the stress.

FIG. 1 shows multiple wrinkle textures 100. Each of these may be applied to the surface using a wrinkle application 102, to provide a wrinkled surface 104. These results for multiple wrinkle textures are then combined together as indicated by blender 106. The blending operation may take several forms such as an arithmetic blend or a rule-based blend in which one wrinkle will dominate over another.

In a wrinkle application, as a pre-processing step, a gradient calculator 108 receives as an input the wrinkle texture 100 and computes from it a gradient texture 110. The gradient texture is created from each wrinkle texture by computing the gradient (a vector) at each pixel in the wrinkle texture. The gradient is the direction in which the intensity of the pixels increases the most. This gradient is perpendicular to the direction in which the wrinkle runs.

A rest pose calculator 112 accesses the gradient texture 110. For each location in a face of a mesh, the gradient vector (representing the direction perpendicular to the wrinkle) from the gradient texture is mapped to the corresponding face of the rest pose skin model, thus providing rest pose surface vectors 114. Similarly, a current pose calculator 116 accesses the gradient texture 110. For each location in a face of a mesh, the gradient vector from the gradient texture is mapped to the corresponding face of the current pose skin model, thus providing current pose surface vectors 118. Thus, two surface vectors are produced for each location in the face, one for the rest pose and one for the current pose. These two vectors represent a line segment on the surface before and after deformation on the surface.

A comparator 120 accesses the surface vectors 114 and 118 for each location. These two vectors from each location in a face of the surface are compared to provide an estimate 122 of the directional surface stress at the location.

FIG. 1 illustrates just one example of computing surface stress. Surface stress, whether compression or stretching, directional or nondirectional, for each pixel within each face of the mesh representing the skin, can be computed in a variety of ways. Stress at a given frame in an animation is determined, in general, by comparing the current state of the mesh at that frame (called a "current pose") to the original state of the mesh (called a "rest pose").

This estimate of directional surface stress is an input to a heuristic for determining the intensity of the wrinkling at that location or can be used for other effects, such as skin coloration. For example, given the estimates of the stress at each location on a face of the surface, wrinkle effects and blood (skin coloration) effects based on this stress can be applied.

A wrinkle effect may be implemented using a bump mapping application 124, to provide the wrinkled surface 126. In this bump mapping application 124, the surface normal to the face is perturbed differently for each location in the face of the mesh based on the skin stress estimated at that location. This perturbation of the surface normal affects all subsequent lighting calculations which gives the appearance of wrinkles or other fine details on a surface. The actual heuristic used can depend on the type of desired effect. For example, the direction of the wrinkle may be either parallel or perpendicular to the direction of the stress (whether stretching or compression). A user-specified parameter may indicate the relative directions of the wrinkle and stress. A simple bump mapping operation could be:

$$n' = n - mageffect * newvec \quad \text{(equation 1)}$$

where n' is the modified surface normal, n is the original surface normal, mageffect is the output of a user-defined function based on the computed stress and newvec is the gradient vector on the current surface. An example of the user-defined function may be the product of a user-specified factor and a function of the two surface vectors of the rest pose and current pose. This result of this function could be limited to a value between −1 and 1. As a specific example, the following function may be used:

$$result = 1 - (clamp(dot(newvec, oldvec), \|oldvec\|), 0, 1) \quad \text{(equation 2)}$$

where oldvec is the gradient vector on the rest surface.

Figure 2:
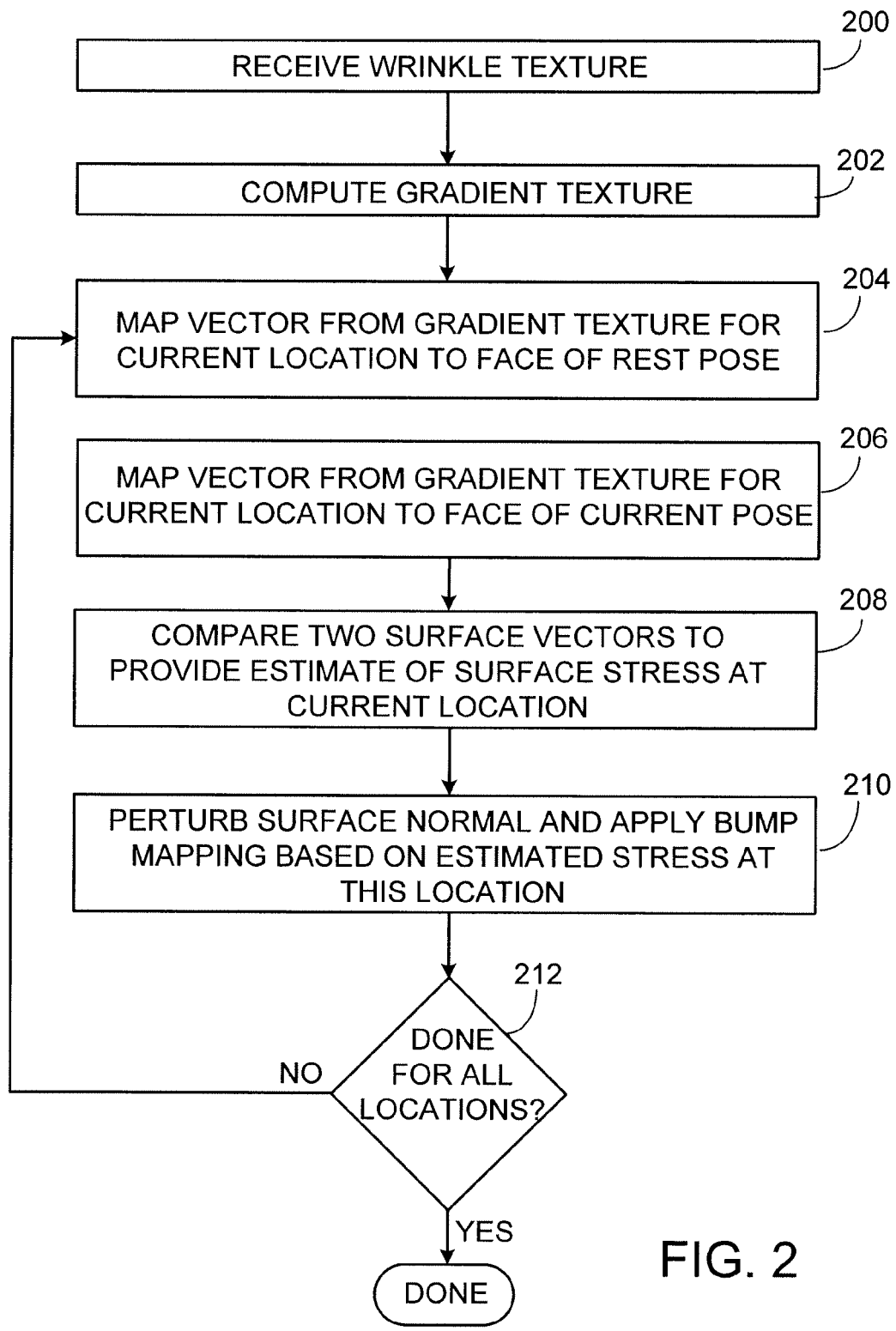
FIG. 2 is a flow chart describing an example way to generate wrinkles.

Having described a data flow diagram for an example implementation, a flow chart for an example implementation of a wrinkle effect will now be described in connection with FIG. 2.

A wrinkle texture, as described above, is received (200) into memory of a computer. The computer then computes (202) the gradient texture. Given a current location on a face, the vector corresponding to the current location in the gradient texture is mapped (204) to the face of the rest pose. The vector corresponding to the current location in the gradient texture is mapped (206) to the face of the current pose. The order of steps 204 and 206 is not relevant. The two surface vectors resulting from steps 204 and 206 are compared 208 to provide an estimate of surface stress at the current location. The surface normal at this location in the current pose is then perturbed (210) based on the estimated stress at this location, and bump mapping is used to apply the wrinkle texture to the face. These steps are performed for each location on a face as indicated at 212.

Multiple wrinkle maps can be provided, applied in layers, or mixed to provide a variety of effects. Each wrinkle map can be processed individually in the manner described above. For example, large, medium and small scale wrinkles can be layered to represent different underlying layers of the skin surface being compressed. Additional textures or maps can be used to adjust the strength of each effect in different regions to simulate different skin thicknesses, or to bias the application of the wrinkle texture, such as to make wrinkles appear even when the skin appears to be in a rest state.

In the foregoing description, stress information for each face of a surface is determined using information local to that face. Adjacent faces, however, may have different stress levels, which may provide results that lack smoothness over the entire surface. If a smoother result is desired, a first pass can be done to compute at each vertex a transformation matrix in the texture space of the skin, approximating the directional deformation a each vertex. The matrices at each vertex of a triangle can then be interpolated across the triangle and used to compute how the wrinkle gradient is deformed, per pixel. The change in length, and the direction of the gradient on the current pose skin model, can be used to perturb the surface normal to affect the lighting.

As a particular implementation, such as described above, a computer program may be defined to execute as a combination of vector shaders and fragment shaders defined using the Open GL Shader Language (GLSL) or other appropriate shader programming language, for execution on a graphics processing unit (GPU). In this implementation, the computation of the gradient texture may be performed in a host computer with a central processing unit (CPU) as a preprocessing step. The fragment shader computes the surface vectors for the rest pose and current pose, perturbs the surface normal according to the estimated stress for the current location computed by the fragment shader and applies the wrinkle texture using bump mapping. The results of multiple fragment shaders may be blended together to layer wrinkle textures. In this implementation, to determine the rest pose and current pose, the coordinates in three dimensional space of the vertices defining the current face are reconstructed by the fragment shader from varyings passed to the fragment shader by associated vector shaders. The vector shader defines varyings and passes the vertex coordinates through these varyings, and these coordinates are reconstructed by the fragment shader using techniques described in U.S. patent application, filed on even date herewith, entitled "Exchange Data Between Vertex Shaders and Fragment Shaders on a Graphics Processing Unit", by Ian Stewart, Dominic Laflamme and Éric Cabot, which is hereby incorporated by reference. Thus, unlike conventional bump mapping techniques for which a fragment shader receives a single interpolated value describing the surface, this implementation provides the fragment shader the ability to determine an estimate of the stress for each location within a face of the surface and apply this estimate in computing the intensity of the wrinkles.

The techniques described above also can be implemented in digital electronic circuitry, or in computer hardware, firmware, software, or in combinations of them. The techniques can be implemented as a computer program product, i.e., a computer program tangibly embodied in a tangible information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Each computer may implemented using one or more programmable processors executing a computer program to perform functions described herein by operating on input data and generating output, or using special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The computer includes a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of implementations of the invention have been described, by way of example only. It should be understood that various modifications and other implementations may be made without departing from the spirit and scope of the invention. Accordingly, such modifications and other implementations are within the scope of the following claims.

What is claimed is:

1. A non-transitory computer-readable storage medium storing instructions that, when executed by a processor, cause the processor to produce effects for a computer-generated character based on surface stress, by performing the steps of receiving a representation of a surface defined by a plurality of faces;
    mapping a wrinkle texture to the surface in a current pose, wherein the wrinkle texture specifies high intensity regions where bulging occurs during compression of the surface and low intensity regions where crevasses are formed during compression of the surface; and
    for each pixel of each face defining the surface in the current pose:
        estimating surface stress indicating compression or stretching at the pixel by comparing a first surface vector corresponding to the surface in a rest pose to a second surface vector corresponding to the surface in the current pose, and
        perturbing a normal vector of the surface in the current pose at the pixel by subtracting from the normal vector a product of a gradient vector corresponding to the pixel and an output of a user-defined function, wherein the user-defined function is product of a user-specified factor and the estimate of surface stress at the pixel.

2. The computer program product of claim 1, wherein a color of the face changes based on a change in blood level responsive to the estimate of surface stress at each pixel.

3. The computer program product of claim 1, further comprising a second wrinkle texture that is layered with the wrinkle texture in regions of the surface to simulate different skin thicknesses.

4. The computer program product of claim 1, further comprising a second wrinkle texture that is layered with the wrinkle texture in regions of the surface to bias application of the wrinkle texture so that wrinkles appear even when the surface is in the rest pose.

5. A method of producing effects for a computer-generated character based on surface stress, comprises:
    receiving a representation of a surface defined by a plurality of faces;
    mapping a wrinkle texture to the surface in a current pose, wherein the wrinkle texture specifies high intensity regions where bulging occurs during compression of the surface and low intensity regions where crevasses are formed during compression of the surface; and
    for each pixel of each face defining the surface in the current pose:
        estimating surface stress indicating compression or stretching at the pixel by comparing a first surface vector corresponding to the surface in a rest pose to a second surface vector corresponding to the surface in the current pose, and
        perturbing a normal vector of the surface in the current pose at the pixel by subtracting from the normal vector a product of a gradient vector corresponding to the pixel and an output of a user-defined function, wherein the user-defined function is product of a user-specified factor and the estimate of surface stress at the pixel.

6. The method of claim 5, wherein a color of the face changes based on a change in blood level responsive to the estimate of surface stress at each pixel.

7. The method of claim 5, further comprising a second wrinkle texture that is layered with the wrinkle texture in regions of the surface to simulate different skin thicknesses.

8. The method of claim 5, further comprising a second wrinkle texture that is layered with the wrinkle texture in regions of the surface to bias application of the wrinkle texture so that wrinkles appear even when the surface is in the rest pose.

9. A system for producing effects for a computer-generated character based on surface stress, the system comprising:
    a memory that is configured to store a wrinkle texture that specifies high intensity regions where bulging occurs during compression of the surface and low intensity regions where crevasses are formed during compression of the surface;
    a graphics processor that is configured to:

receive a representation of a surface defined by a plurality of faces;
map a wrinkle texture to the surface in a current pose; and
for each pixel of each face defining the surface in the current pose:
estimate surface stress indicating compression or stretching at the pixel by comparing a first surface vector corresponding to the surface in a rest pose to a second surface vector corresponding to the surface in the current pose, and
perturbing a normal vector of the surface in the current pose at the pixel by subtracting from the normal vector a product of a gradient vector corresponding to the pixel and an output of a user-defined function, wherein the user-defined function is product of a user-specified factor and the estimate of surface stress at the pixel.

10. The system of claim 9, wherein the graphics processing unit is further configured to change a color of the face based on a change in blood level responsive to the estimate of surface stress at each pixel.

11. The system of claim 9, wherein the memory is further configured to store a second wrinkle texture and the graphics processing unit is further configured to layer the second wrinkle texture with the wrinkle texture in regions of the surface to simulate different skin thicknesses.

12. The computer program product of claim 1, further comprising clamping the output of the user-defined function to a value between −1 and 1.

13. The computer program product of claim 1, further comprising:
for each vertex of a face, approximating directional deformation by computing a transformation matrix in texture space of the surface;
for each face of the surface, interpolating the respective transformation matrices computed at each vertex of the face across the face to compute per pixel deformations of a wrinkle gradient; and
for each pixel, perturbing the normal vectors of the surface in the current pose based on the change in length of the wrinkle gradient for the pixel.

14. The computer program product of claim 1, wherein the estimating the surface stress at each pixel further comprises:
determining a gradient texture from the wrinkle texture mapped to the surface;
mapping a gradient vector corresponding to the pixel from the gradient texture to the face in the rest pose to produce the first surface vector; and
mapping the gradient vector corresponding to the pixel from the gradient texture to the face in the current pose to produce the second surface vector.

15. The method of claim 5, further comprising clamping the output of the user-defined function to a value between −1 and 1.

16. The method of claim 5, further comprising:
for each vertex of a face, approximating directional deformation by computing a transformation matrix in texture space of the surface;
for each face of the surface, interpolating the respective transformation matrices computed at each vertex of the face across the face to compute per pixel deformations of a wrinkle gradient; and
for each pixel, perturbing the normal vectors of the surface in the current pose based on the change in length of the wrinkle gradient for the pixel.

17. The method of claim 5, wherein the estimating the surface stress at each pixel further comprises:
determining a gradient texture from the wrinkle texture mapped to the surface;
mapping a gradient vector corresponding to the pixel from the gradient texture to the face in the rest pose to produce the first surface vector; and
mapping the gradient vector corresponding to the pixel from the gradient texture to the face in the current pose to produce the second surface vector.

18. The system of claim 9, wherein the graphics processing unit is further configured to clamp the output of the user-defined function to a value between −1 and 1.

19. The system of claim 9, wherein the graphics processing unit is further configured to:
for each vertex of a face, approximate directional deformation by computing a transformation matrix in texture space of the surface;
for each face of the surface, interpolate the respective transformation matrices computed at each vertex of the face across the face to compute per pixel deformations of a wrinkle gradient; and
for each pixel, perturb the normal vectors of the surface in the current pose based on the change in length of the wrinkle gradient for the pixel.

20. The system of claim 9, wherein the graphics processing unit is further configured to estimate the surface stress at each pixel by:
determining a gradient texture from the wrinkle texture mapped to the surface;
mapping a gradient vector corresponding to the pixel from the gradient texture to the face in the rest pose to produce the first surface vector; and
mapping the gradient vector corresponding to the pixel from the gradient texture to the face in the current pose to produce the second surface vector.

* * * * *